J. M. SELDOMRIDGE.
Tram and Level for Mills.
No. 38,508. Patented May 12, 1863.
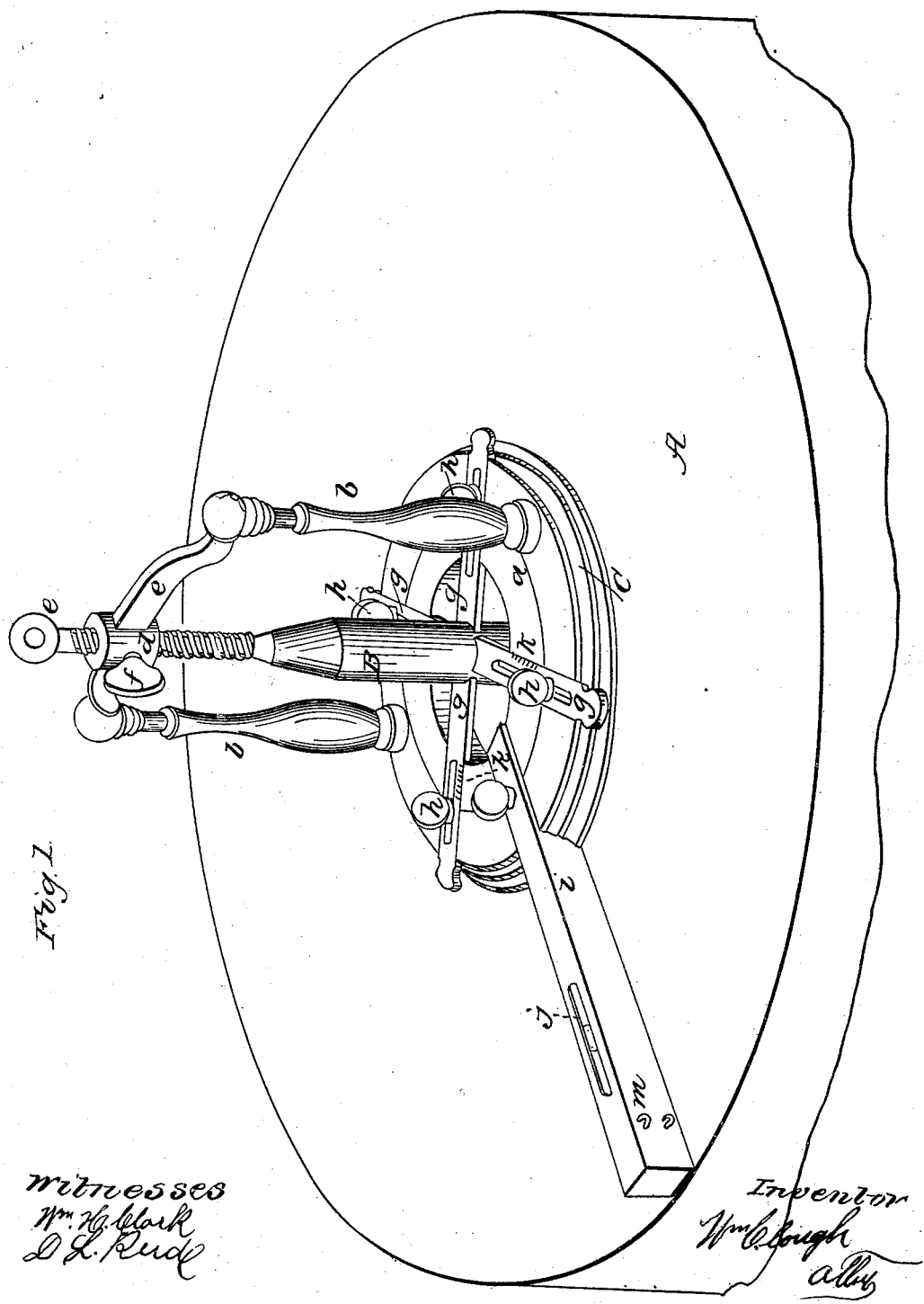

UNITED STATES PATENT OFFICE.

JOHN M. SELDOMRIDGE, OF SPRING VALLEY, OHIO.

IMPROVEMENT IN TRAM AND LEVEL FOR MILLS.

Specification forming part of Letters Patent No. 38,508, dated May 12, 1863.

*To all whom it may concern:*

Be it known that I, J. M. SELDOMRIDGE, of Spring Valley, in the county of Greene and State of Ohio, have invented a new and Improved Tram and Level; and I do hereby declare the following to be a full, clear, and exact description of the same, reference being had to the accompanying drawing and letters of reference marked thereon.

My invention relates to an instrument for plumbing, centering, and tramming mill-spindles and leveling the bed-stones of grinding-mills, as hereinafter described.

The accompanying drawing is a perspective representation of the bed-stone of a grinding-mill and spindle with my improved tram and level applied thereto in the manner it is designed to be used.

A is the bed-stone of an ordinary grinding-mill; B, the spindle; and C is the instrument, the construction and use of which are as follows:

$a$ is an annular frame, which rests centrally upon the face of the bed-stone.

$b\ b$ are standards, connected by a cross-piece, $c$, in the center of which, or midway between the two standards, is an enlargement, $d$, through which a screw, $e$, passes. The lower end of this screw is recessed or concaved for the purpose of receiving the upper end or cock-head of the spindle, to be referred to hereinafter. The screw $e$ is confined, when necessary, by the set-screw $f$.

$g\ g$, &c., are four radial slides, which are nicely fitted to appropriate recesses in the upper face of frame $a$, and, when properly set, are confined in place by thumb-screws $h\ h$, &c.

$k\ k$, &c., are graduations upon the slides $g\ g$, &c., for a purpose which will be explained.

$i$ is a projecting arm from the circumference of $a$, and of considerable length. It may be made to reach to the circumference of the bed-stone.

$j$ is a spirit-glass adapted to the arm $i$, by which the level of the instrument is indicated. It is obvious that this glass may be placed in any other convenient part of the instrument where its function would be the same as in the extended arm.

The mode of using my improved tram and level is as follows: The instrument is first placed on the face of the bed-stone, and centrally thereto. The screw $e$ is then turned down until the recess in its lower end receives the upper point of the spindle B, and until the whole instrument is raised slightly from the face of the stone, and is supported above it by the point of the spindle. The slides $g\ g$, &c., are then closed around the collar of the spindle, but with a careful reference to the graduations $k$, these being so formed relatively to fixed points on the annular frame $a$ that when they embrace the collar of the spindle appropriately the latter will be confined centrally to the instrument. The spirit-glass in the arm $i$ will now indicate whether the spindle is vertical, and enable the workman to tram it correctly. In this operation the instrument should be rotated around and observations taken in different positions. Having plumbed and trammed the spindle, observations may be taken to determine and adjust the level of the stone. For this purpose insert a quill or some delicate instrument into some suitable receptacle, as the small wire staples $m$, (shown on the vertical face of arm $i$,) so that the point will approach very closely to or touch the face of the stone. The instrument, upon being then rotated, will indicate very closely by the point of the quill when the face of the stone is horizontal, and, of course, when it is exactly at right angles with the spindle. The importance of securing the spindle in a true vertical position has been too little regarded by many operators. The instruments in use have been defective, and it is generally supposed that if the spindle is adjusted at right angles with the face of the bed-stone nothing more is required. In my experience I am convinced that such an adjustment is not only required, but that the one should be absolutely vertical and the other absolutely horizontal. To enable this to be attained with the utmost nicety, and with but little difficulty on the part of any ordinary operator, is the object of my invention.

Having fully described the construction and mode of operating my improved tram and level, what I claim as new, and desire to secure by Letters Patent, is the following:

The combination of the center-screw $e$ and radial slides $g\ g$, &c., for adjusting the instrument appropriately to the spindle, and the projecting arm $i$, for the purpose described.

JOHN M. SELDOMRIDGE.

Witnesses:
W. J. ALEXANDER,
J. C. ALEXANDER.